United States Patent
Horio et al.

(10) Patent No.: US 7,534,491 B2
(45) Date of Patent: May 19, 2009

(54) OPTICAL LAMINATE

(75) Inventors: Tomoyuki Horio, Tokyo-To (JP); Hiroomi Katagiri, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 355 days.

(21) Appl. No.: 11/226,064

(22) Filed: Sep. 14, 2005

(65) Prior Publication Data

US 2006/0134426 A1 Jun. 22, 2006

(30) Foreign Application Priority Data

Sep. 29, 2004 (JP) ............................. 2004-283480
Mar. 24, 2005 (JP) ............................. 2005-085545

(51) Int. Cl.
*B32B 27/00* (2006.01)

(52) U.S. Cl. .................... 428/411.1; 428/412; 428/413; 428/423.1; 428/474.4; 428/480; 428/500

(58) Field of Classification Search ................. 428/412, 428/423.1, 411.1, 413, 474.4, 480, 500
See application file for complete search history.

(56) References Cited

U.S. PATENT DOCUMENTS 6,207,263 B1 * 3/2001 Takematsu et al. .......... 428/220
6,476,969 B2 * 11/2002 Oka et al. ................... 359/582

\* cited by examiner

*Primary Examiner*—Thao T. Tran
(74) *Attorney, Agent, or Firm*—Burr & Brown

(57) ABSTRACT

An optical laminate is provided, which includes a light transparent base material and a hardcoat layer provided on the light transparent base material. The hardcoat layer is formed of a composition comprising a first resin having a weight average molecular weight of not less than 200 and not more than 10000 and containing more than 2 functional groups, a second resin having a weight average molecular weight of not less than 200 and not more than 1000 and containing two or less functional groups, and a penetrative solvent.

8 Claims, 2 Drawing Sheets

OPTICAL LAMINATE

RELATED APPLICATION

This application is a patent application claiming priority based on Japanese Patent Application Nos. 283480/2004 and 85545/2005, the entirety of which is incorporated herein.

TECHNICAL FIELD

The present invention relates to an optical laminate that can prevent interface reflection and interference fringes.

BACKGROUND ART

Image display surfaces in image display devices such as liquid crystal displays (LCDs) or cathode ray tube display devices (CRTs) are required to reduce the reflection of light applied from an external light source and thus to enhance the visibility of the image. To meet this demand, it is common practice to utilize an optical laminate comprising an anti-dazzling layer or anti-reflection layer provided on a light transparent base material (for example, an anti-reflective laminate) and thus to reduce the reflection of light from an image display surface in the image display device, whereby the visibility of the image is improved.

In an optical laminate comprising layers with a large refractive index difference stacked on top of each other, however, interface reflection and interference fringes often occur at the interface of the mutually superimposed layers. In particular, when black is reproduced on an image display surface in a screen display device, the occurrence of interference fringes is significant, resulting in lowered visibility of the image. Further, it has been pointed out that, in this case, the appearance of the image display surface is deteriorated. In particular, it is said that interference fringes are likely to occur when the refractive index of the light transparent base material and the refractive index of the hardcoat layer are different from each other.

In order to suppress the occurrence of interference fringes, Japanese Patent Laid-Open No. 205563/2003 proposes a method for forming, on a base material, a hardcoat layer using a resin containing a solvent capable of dissolving the base material.

So far as the present inventors know, up to now, there have not been proposed an optical laminate comprising a light transparent base material and a hardcoat layer, formed on the light transparent base material, using two or more resins having a specific molecular weight and containing a functional group(s) and a penetrative solvent, the interface between the light transparent base material and the hardcoat layer having been rendered substantially absent.

SUMMARY OF THE INVENTION

At the time of this invention, the present inventors have found that the formation of a hardcoat layer, on a light transparent base material, using two or more resins having a specific molecular weight and containing a functional group(s) and a penetrative solvent can provide an optical laminate that can improve the state of the interface between the light transparent base material and the hardcoat layer and consequently can effectively prevent interface reflection and interference fringes and, at the same time, has strength inherent in the hardcoat layer. Accordingly, an object of the present invention is to provide an optical laminate having improved visibility and mechanical strength by effectively preventing interface reflection and interference fringes through substantial elimination of the interface between the light transparent base material and the hardcoat layer.

Thus, according to the present invention, there is provided an optical laminate comprising a light transparent base material and a hardcoat layer provided on the light transparent base material, wherein the hardcoat layer is formed of a composition comprising (1) a resin having a weight average molecular weight of not less than 200 and not more than 10000 and containing more than 2 functional groups, (2) a resin having a weight average molecular weight of not less than 200 and not more than 1000 and containing two or less functional groups, and a penetrative solvent.

According to another aspect of the present invention, there is provided an optical laminate comprising a light transparent base material and a hardcoat layer provided on the light transparent base material, wherein the hardcoat layer is formed of a composition comprising (1) a resin having a weight average molecular weight of not less than 200 and not more than 10000 and containing more than 2 functional groups, (2) a resin having a weight average molecular weight of not less than 200 and not more than 1000 and containing two or less functional groups, (3) a resin having a weight average molecular weight of not less than 10000 and containing more than two functional groups, and a penetrative solvent.

DETAILED DESCRIPTION OF THE INVENTION

1. Optical Laminate

Figure 1:
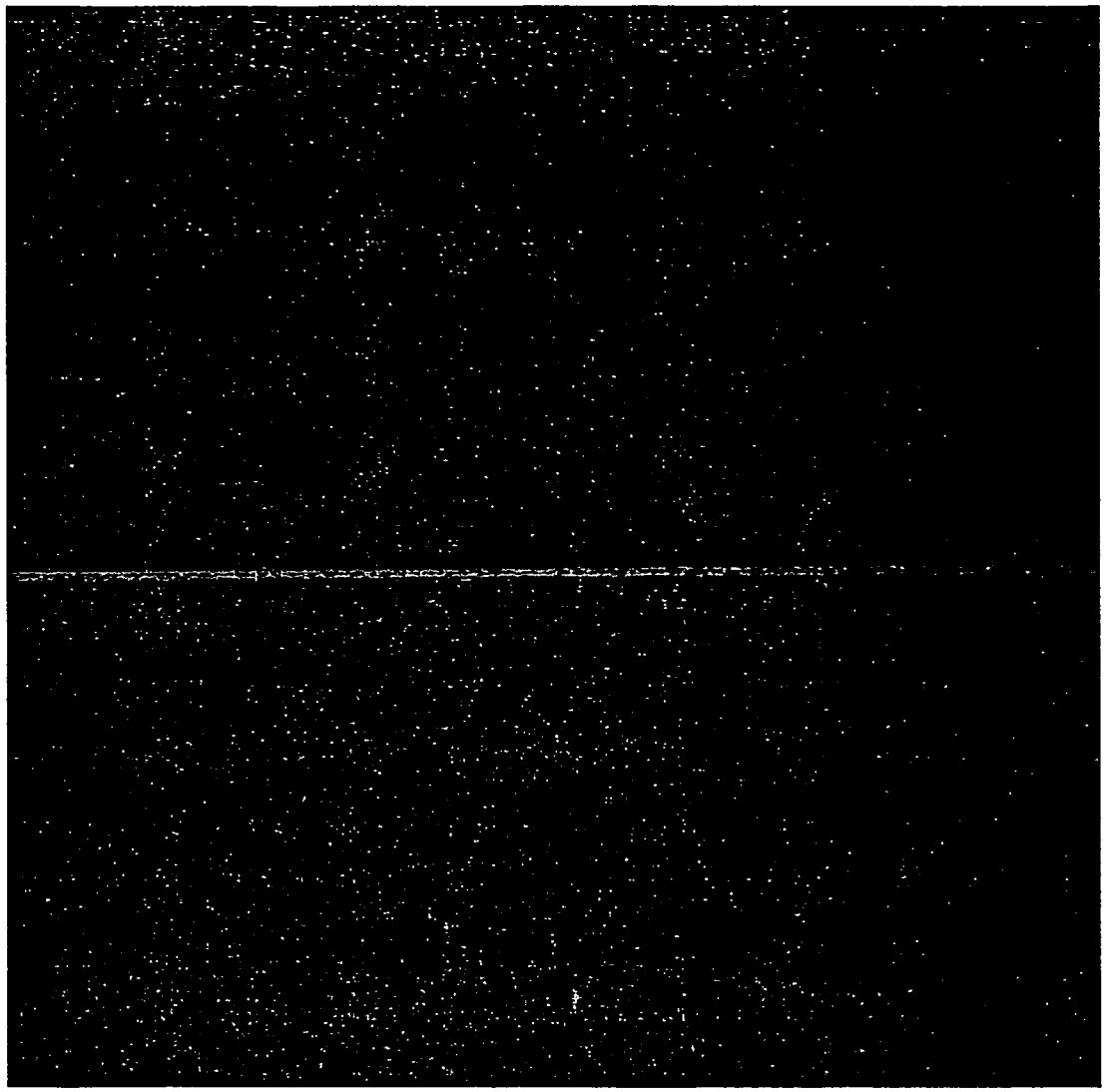
FIG. 1 is a laser microphotograph of the section of an optical laminate according to the present invention.

In the optical laminate according to the present invention, since the composition comprising a resin and a penetrative solvent is coated on a light transparent base material to form a hardcoat layer, the occurrence of the interface between the light transparent base material and the hardcoat layer can be suppressed and, thus, the occurrence of interface reflection and interference fringes can be effectively prevented. In fact, it is considered that the hardcoat layer has been formed without substantially forming the interface between the light transparent base material and the hardcoat layer. The wording "the interface is substantially absent" as used herein embraces not only the case where, although two layer surfaces are put on top of each other, the interface is actually absent between the two layers, but also the case where, in view of the refractive index, it is judged that an interface is absent between the two layers. The specific standard of "the interface is substantially absent" may be, for example, that in the observation of the section of an optical laminate under a laser microscope, an interface is present in the section of the laminate in which interference fringes are visually observed, while an interface is absent in the section of the laminate in which interference fringes are not visually observed. The laser microscope can nondestructively observe the section of a laminate comprising layers different from each other in refractive index, and, thus, in a laminate comprising materials not having any significant refractive index difference, the results of measurement are such that any interface is not present. Accordingly, also based on the refractive index, it can be judged that any interface is not present between the base material and the hardcoat layer.

In the present invention, when the above composition comprising a resin and a penetrative solvent is coated onto a light transparent base material, this composition penetrates into the light transparent base material (the light transparent base material is wetted with the composition). Thereafter, the resin in the composition is cured and dried to evaporate the penetrative solvent and thus to form a hardcoat layer on the light transparent base material, and, hence, it appears that any interface is not substantially present at a face where both the light transparent base material and the hardcoat layer are mutually superimposed. Although the mechanism cannot easily be understood, it is believed that this is attributable to the formation of the hardcoat layer by coating of the composition of a resin and a penetrative solvent.

Hardcoat Layer

The term "hardcoat layer" as used herein refers to a coat layer having a hardness of "H" or more in a pencil hardness test specified in JIS 5600-5-4 (1999). The thickness of the hardcoat layer (on a cured state basis) is preferably in the range of 0.1 to 100 μm, more preferably in the range of 0.8 to 20 μm. The hardcoat layer is formed on the light transparent base material using a composition comprising a resin and a penetrative solvent.

1) Resin

Resin (1)

A resin having a weight average molecular weight of not less than 200 and not more than 10000 and containing two or more functional group is used. Such resins include acrylic resins, polyester resins, polyolefin resins, polycarbonate resins, polyamide resins, polyether resins, epoxy resins, urethane resins, alkyd resins, spiroacetal resins, polybutadiene resins, polythiol polyether resins, polyhydric alcohols, (meth)acrylate resins such as ethylene glycol (meth)acrylate and pentaerythritol (meth)acrylate monostearate, and their mixtures. Specific examples of resins belonging to these resins include pentaerythritol triacrylate, pentaerythritol tetraacrylate, dipentaerythritol hexaacrylate, trimetylolpropane triacrylate, trimetylolethane triacrylate, isocyanuric acid EO-modified triacrylate, and urethane acrylate oligomer.

Specific examples of functional groups contained in the resins (1) include (meth)acrylate functional, hydroxyl, carboxyl, epoxy, amino, vinyl, and alkoxyl groups and mixtures thereof. Preferred are (meth)acrylate functional groups.

Resin (2)

A resin having a weight average molecular weight of not less than 200 and not more than 1000 and containing two or less functional group is used. Such resins (2) include acrylic resins, polyester resins, polyolefin resins, polycarbonate resins, polyamide resins, polyether resins, epoxy resins, urethane resins, alkyd resins, spiroacetal resins, polybutadiene resins, polythiol polyether resins, polyhydric alcohols, (meth)acrylate resins such as ethylene glycol (meth)acrylate and pentaerythritol (meth)acrylate monostearate, and their mixtures.

Specific examples of resins belonging to these resins include compounds such as ethylene glycol diacrylate, triethylene glycol diacrylate, propylene glycol diacrylate, neopentylglycol diacrylate, 1,6-hexanediol diacrylate, and triethylene glycol diacrylate, dipropylene glycol diacrylate, tripropylene glycol diacrylate, 1,4-butanediol diacrylate, isocyanuric acid EO-modified diacrylate, bisphenol F EO-modified diacrylate, bisphenol A EO-modified diacrylate, 3-methylpentanediol di(meth)acrylate, poly 1,2-butadiene di(meth)acrylate, 3-methylpentanediol diacrylate, diethylene glycol bis-β-acryloyloxypropionate, hydroxypivalate neopentyl glycol diacrylate, and bisphenol A diglycidyl ether acrylate.

The functional groups contained in the resin (2) may be the same as those described above in connection with the resin (1).

In a preferred embodiment of the present invention, the mixing ratio between the resin (1) and the resin (2) is more than 10:0 and not more than 1:9, preferably not less than 9.5:0.5 and not more than 2:8.

Resin (3)

According to another aspect of the present invention, there is provided an optical laminate comprising a hardcoat layer formed from a composition comprising a resin (1), a resin (2), and a resin (3).

The resin (3) has a weight average molecular weight of not less than 10000 and contains two or more functional groups. Examples of resins (3) include acrylic resins, polyester resins, polyolefin resins, polycarbonate resins, polyamide resins, polyether resins, epoxy resins, urethane resins, alkyd resins, spiroacetal resins, polybutadiene resins, polythiol polyether resins, polyhydric alcohols, (meth)acrylate resins such as ethylene glycol (meth)acrylate and pentaerythritol (meth)acrylate monostearate, and their mixtures. Specific examples of resins belonging to these resins include urethan acrylate polymers.

The functional group contained in the resin (3) may be the same as described above in connection with the resin (1).

In a preferred embodiment of the present invention, the mixing ratio between the resins (1) and (2) and the resin (3) is not less than 5:95 and not more than 95:5, preferably not less than 10:90 and not more than 90:10.

2) Penetrative Solvent

A solvent penetrative into the light transparent base material is used as the penetrative solvent. Accordingly, in the present invention, the term "penetrative" used in conjunction with the penetrative solvent embraces all concepts of penetrating properties, swelling properties, wetting properties and the like with respect to the light transparent base material. The penetrative solvent has the effect of effectively preventing interference fringes in the optical laminate.

Specific examples of penetrative solvents include alcohols such as methanol, ethanol, isopropyl alcohol, butanol, isobutyl alcohol, methyl glycol, methyl glycol acetate, methyl cellosolve, ethyl cellosolve, and butyl cellosolve; ketones such as acetone, methyl ethyl ketone, methyl isobutyl ketone, cyclohexanone, and diacetone alcohol; esters such as methyl formate, methyl acetate, ethyl acetate, ethyl lactate and butyl acetate; nitrogen-containing compounds such as nitromethane, N-methyl pyrrolidone, and N,N-dimethyl formamide; ethers such as diisopropyl ether, tetrahydrofuran, dioxane, and dioxolane; halogenated hydrocarbons such as methylene chloride, chloroform, trichloroethane, and tetrachloroethane; other solvents such as dimethyl sulfoxide and propylene carbonate; or mixtures thereof. More preferred penetrative solvents include methyl acetate, ethyl acetate, butyl acetate, and methyl ethyl ketone.

3) Antistatic Agent and/or Anti-Dazzling Agent

The hardcoat layer according to the present invention may comprise other agents and preferably comprises an antistatic agent and/or an anti-dazzling agent.

Antistatic Agent (Electrically Conductive Agent)

Specific examples of antistatic agents usable for antistatic layer formation include quaternary ammonium salts, pyridinium salts, various cationic compounds containing cationic groups such as primary to tertiary amino groups, anionic compounds containing anionic groups such as sulfonic acid bases, sulfuric ester bases, phosphoric ester bases, and phosphonic acid bases, amphoteric compounds such as amino acid and aminosulfuric acid ester compounds, nonionic compounds such as amino alcohol, glycerin, and polyethylene glycol compounds, organometal compounds such as alkoxides of tin and titanium, and metal chelate compounds such as their acetyl acetonate salts. Further, compounds prepared by increasing the molecular weight of the above exemplified compounds may also be mentioned. Furthermore, monomers or oligomers, which contain a tertiary amino group, a quaternary ammonium group, or a metal chelate part and is polymerizable by an ionizing radiation, or polymerizable compounds, for example, organometal compounds such as coupling agents containing a functional group(s) polymerizable by an ionizing radiation may also be used as the antistatic agent.

Electrically conductive ultrafine particles may also be mentioned. Specific examples of electrically conductive fine particles include fine particles of metal oxides. Such metal oxides include ZnO (refractive index 1.90; numerical value within the parentheses referred to hereinbelow being a refractive index value), $CeO_2$ (1.95), $Sb_2O_2$ (1.71), $SnO_2$ (1.997), indium tin oxide often abbreviated to ITO (1.95), $In_2O_3$ (2.00), $Al_2O_3$ (1.63), antimony doped tin oxide (abbreviation; ATO, 2.0), and aluminum doped zinc oxide (abbreviation; AZO, 2.0). Fine particles refer to particles having a size of not more than 1 micron, that is, the so-called submicron size, preferably having an average particle diameter of 0.1 nm to 0.1 μm.

Anti-Dazzling Agent

The anti-dazzling agent may be the same as described in connection with the anti-dazzling layer which will be described later.

Light Transparent Base Material

The light transparent base material may be a transparent, semi-transparent, colorless or colored material so far as it is transparent to light. Preferably, however, the light transparent base material is colorless and transparent. Specific examples of light transparent base materials include glass plates; or thin films formed, for example, from the following resins: triacetate cellulose (TAC), polyethylene terephthalate (PET), diacetyl cellulose, acetate butylate cellulose, polyethersulfones, and acrylic resins; polyurethane resins; polyesters; polycarbonates; polysulfones; polyethers; trimethylpentene; polyether ketones; and (meth)acrylonitriles and the like. In a preferred embodiment of the present invention, the base material is triacetate cellulose (TAC). The thickness of the light transparent base material is about 30 μm to 200 μm, preferably 40 μm to 200 μm.

Other Layers

As described above, the optical laminate according to the present invention basically comprises a light transparent base material and a hardcoat layer provided on the light transparent base material. However, one or at least two layers, described below, selected by taking into consideration the function or application as the optical laminate may be provided between the light transparent base material and the hardcoat layer or on the hardcoat layer.

Antistatic Layer

The antistatic layer comprises an antistatic agent and a resin. The antistatic agent and the solvent may be the same as described above in connection with the hardcoat layer. The thickness of the antistatic layer is preferably in the range of about 30 nm to 1 μm.

Resin

Specific examples of resins usable herein include thermoplastic resins, heat curing resins, or ionizing radiation curing resins or ionizing radiation curing compounds (including organic reactive silicon compounds). Thermoplastic resins may be used as the resin. More preferably, heat curing resins are used. Still more preferred are ionizing radiation curing resins or ionizing radiation curing compound-containing ionizing radiation curing compositions.

The ionizing radiation curing composition is a composition prepared by properly mixing a prepolymer, oligomer and/or monomer containing a polymerizable unsaturated bond or epoxy group in its molecule together. The ionizing radiation refers to a radiation having an energy quantum which can polymerize or crosslink the molecule among electromagnetic waves or charged particle beams and is generally ultraviolet light or electron beams.

Examples of prepolymers and oligomers in the ionizing radiation curing composition include unsaturated polyesters such as condensates of unsaturated dicarboxylic acids and polyhydric alcohols, methacrylates such as polyester methacrylate, polyether methacrylate, polyol methacrylate, and melamine methacrylate, acrylates such as polyester acrylate, epoxy acrylate, urethane acrylate, polyether acrylate, polyol acrylate, and melamine acrylate, and cation polymerizable epoxy compounds.

Examples of monomers in the ionizing radiation curing composition include styrene monomers such as styrene and α-methyl styrene, acrylic esters such as methyl acrylate, 2-ethylhexyl acrylate, methoxyethyl acrylate, butoxyethyl acrylate, butyl acrylate, methoxybutyl acrylate, and phenylacrylate, methacrylic esters such as methyl methacrylate, ethyl methacrylate, propyl methacrylate, methoxyethyl methacrylate, ethoxymethyl methacrylate, phenyl methacrylate, and lauryl methacrylate, unsaturated substituted amino alcohol esters such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate, unsaturated carboxylic acid amides such as acrylamide and methacrylamide, compounds such as ethylene glycol diacrylate, propylene glycol diacrylate, neopentyl glycol diacrylate, 1,6-hexanediol diacrylate, and triethylene glycol diacrylate, polyfunctional compounds such as dipropylene glycol diacrylate, ethylene glycol diacrylate, propylene glycol dimethacrylate, and diethylene glycol dimethacrylate, and/or polythiol compounds containing two or more thiol groups in the molecule thereof, for example, trimethylolpropane trithioglycolate, trimethylolpropane trithiopropylate, and pentaerythritol tetrathioglycolate.

In general, if necessary, one or a mixture of at least two of the compounds described above is used as the monomer in the ionizing radiation curing composition. In order to impart ordinary coatability to the ionizing radiation curing composition, preferably, the content of the prepolymer or oligomer is brought to not less than 5% by weight, and the content of the monomer and/or polythiol compound is brought to not more than 95% by weight.

When flexibility is required of a film formed by coating the ionizing radiation curing composition and curing the coating, this requirement can be met by reducing the amount of the monomer or using an acrylate monomer having one or two functional groups. When abrasion resistance, heat resistance, and solvent resistance are required of a film formed by coating the ionizing radiation curing composition and curing the coating, this requirement can be met by tailoring the design of the ionizing radiation curing composition, for example, by using an acrylate monomer having three or more functional groups. Monofunctional acrylate monomers include 2-hydroxy acrylate, 2-hexyl acrylate, and phenoxyethyl acrylate. Difunctional acrylate monomers include ethylene glycol diacrylate and 1,6-hexanediol diacrylate. Tri- or higher functional acrylate monomers include trimethylolpropane triacrylate, pentaerythritol triacrylate, pentaerythritol tetraacrylate, and dipentaerythritol hexaacrylate.

In order to regulate properties such as flexibility or surface hardness of a film formed by coating the ionizing radiation curing composition and curing the coating, a resin not curable by ionizing radiation irradiation may also be added to the ionizing radiation curing composition. Specific examples of resins usable herein include thermoplastic resins such as polyurethane resins, cellulosic resins, polyvinyl butyral resins, polyester resins, acrylic resins, polyvinylchloride resins, and polyvinyl acetate. Among them, polyurethane resins, cellulosic resins, polyvinyl butyral resins and the like are preferably added from the viewpoint of improving the flexibility.

When curing after coating of the ionizing radiation curing composition is carried out by ultraviolet light irradiation, photopolymerization initiators or photopolymerization accelerators are added. In the case of radically polymerizable unsaturated group-containing resins, photopolymerization initiators usable herein include acetophenones, benzophenones, thioxanthones, benzoins, and benzoin methyl ethers. They may be used either solely or as a mixture of two or more. In the case of cationically polymerizable functional group-containing resins, photopolymerization initiators usable herein include aromatic diazonium salts, aromatic sulfonium salts, aromatic iodonium salts, metallocene compounds, benzoin sulfonates and the like. They may be used either solely or as a mixture of two or more. The amount of the photopolymerization initiator added is 0.1 to 10 parts by weight based on 100 parts by weight of the ionizing radiation curing composition.

The ionizing radiation curing composition may be used in combination with the following organic reactive silicon compound.

One of organic silicon compounds usable herein is represented by general formula $R_mSi(OR')_n$ wherein R and R' represent an alkyl group having 1 to 10 carbon atoms; and m as a subscript of R and n as a subscript of OR' each are an integer satisfying a relationship represented by m+n=4.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Organic silicon compounds usable in combination with the ionizing radiation curing composition are silane coupling agents. Specific examples thereof include γ-(2-aminoethyl) aminopropyltrimethoxysilane, γ-(2-aminoethyl) aminopropylmethyldimethoxysilane, β-(3,4-epoxycyclohexyl) ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyl-tris(β-methoxyethoxy)silane, octadecyldimethyl[3-(trimethoxysilyl)propyl] ammonium chloride, methyltrichlorosilane, and dimethyldichlorosilane.

Anti-Dazzling Layer

Preferably, the anti-dazzling layer may be provided between the transparent base material and the hardcoat layer or the lower-refractive index layer. The anti-dazzling layer may be formed of a resin and an anti-dazzling agent, and the resin is properly selected from the resins described above in connection with the hardcoat layer. The thickness of the anti-dazzling layer (on a cured basis) is preferably in range of 0.1 to 100 μm, preferably 0.8 to 10 μm. When the layer thickness is in the above-defined range, the function as the anti-dazzling layer can be staisfactorily developed.

In a preferred embodiment of the present invention, the anti-dazzling layer simultaneously satisfies all the following formulae:

$30 \leq Sm \leq 600$;
$0.05 \leq Rz \leq 1.60$;
$0.1 \leq \theta a \leq 2.5$; and
$0.3 \leq R \leq 15$ wherein R represents the average particle diameter of the fine particles, μm; Rz represents the ten point average roughness of concaves and convexes in the anti-dazzling layer, μm; Sm represents average spacing of profile (concave-convex) irregularities in the anti-dazzling layer, μm; and θa represents the average inclination angle of the concave-convex part.

In another preferred embodiment of the present invention, the anti-dazzling layer is such that the fine particles and the transparent resin composition satisfy $\Delta n = |n1-n2| < 0.1$ wherein n1 represents the refractive index of the fine particles; and n2 represents the refractive index of the transparent resin composition, and, at the same time, the haze value within the anti-dazzling layer is not more than 55%.

1) Anti-Dazzling Agent

Fine particles may be mentioned as the anti-dazzling agent and may be in the form of sphere, ellipse and the like, preferably sphere. The fine particles may be either inorganic or organic type. The fine particles exhibit anti-dazzling properties and are preferably transparent. Specific examples of fine particles include inorganic fine particles such as silica beads and organic fine particles such as plastic beads. Specific examples of plastic beads include styrene beads (refractive index 1.59), melamine beads (refractive index 1.57), acrylic beads (refractive index 1.49), acrylic-styrene beads (refractive index 1.54), polycarbonate beads, polyethylene beads and the like. The amount of the fine particles added is 2 to 30 parts by weight, preferably about 10 to 25 parts by weight, based on 100 parts by weight of the transparent resin composition.

In preparing the composition for an anti-dazzling layer, the addition of an anti-settling agent is preferred. The addition of the anti-settling agent can suppress the precipitation of resin beads and can homogeneously disperse the resin beads within a solvent. Specific examples of anti-settling agents include silica beads having a particle diameter of not more than 0.5 μm, preferably about 0.1 to 0.25 μm.

2) Resin

The resin is preferably transparent, and specific examples thereof include three types of resins curable upon exposure to ultraviolet light or electron beams, that is, ionizing radiation curing resins, mixtures of ionizing radiation curing resins and solvent drying-type resins, and heat curing resins. Preferred are ionizing radiation curing resins.

Specific examples of ionizing radiation curing resins include acrylate functional group-containing resins, for example, relatively low-molecular weight polyester resins, polyether resins, acrylic resins, epoxy resins, urethane resins, alkyd resins, spiroacetal resins, polybutadiene resins, polythiolpolyene resins, oligomers or prepolymers of (meth)acrylates or the like of polyfunctional compounds such as polyhydric alcohols, and reactive diluents. Specific examples thereof include monofunctional monomers and polyfunctional monomers such as ethyl (meth)acrylate, ethylhexyl (meth)acrylate, styrene, methylstyrene, N-vinylpyrrolidone, for example, polymethylolpropane tri(meth)acrylate, hexanediol (meth)acrylate, tripropylene glycol di(meth)acrylate, diethylene glycol di(meth)acrylate, pentaerithritol tri(meth)acrylate, dipentaerithritol hexa(meth)acrylate, 1,6-hexanediol di(meth)acrylate, neopentyl glycol di(meth)acrylate or the like.

When an ionizing radiation curing resin is used as the ultraviolet curing resin, the use of a photopolymerization initiator is preferred. Specific examples of photopolymerization initiators include acetophenones, benzophenones, Michler's benzoyl benzoate, α-amyloxime ester, tetramethylthiuram monosulfide, and thioxanthones. Further, a photosensitizer is preferably mixed in the resin, and specific examples thereof include n-butylamine, triethylamine, poly-n-butylphosphine.

The solvent drying-type resin mixed into the ionizing radiation curing resin is mainly a thermoplastic resin. Generally exemplified thermoplastic resins may be used. The occurrence of coating film defects in the coating surface can be effectively prevented by adding the solvent drying-type resin. In a preferred embodiment of the present invention, when the material for the transparent base material is a cellulosic resin such as TAC, specific examples of preferred thermoplastic resins include cellulosic resins, for example, nitrocellulose resins, acetyl cellulose resins, cellulose acetate propionate resins, and ethylhydroxyethylcellulose resins. Cellulosic resins may be mentioned.

Specific examples of heat curing resins include phenolic resins, urea resins, diallyl phthalate resins, melanin resins, guanamine resins, unsaturated polyester resins, polyurethane resins, epoxy resins, aminoalkyd resins, melamine-urea co-condensation resins, silicone resins, and polysiloxane resins. When heat curing resins are used, if necessary, curing agents such as crosslinking agents and polymerization initiators, polymerization accelerators, solvents, viscosity modifiers and the like may also be added.

Lower-Refractive Index Layer

The lower-refractive index layer may be formed of a thin film comprising a silica- or magnesium fluoride-containing resin, a fluororesin as a lower-refractive index resin, or a silica- or magnesium fluoride-containing fluororesin and having a refractive index of not more than 1.46 and a thickness of about 30 nm to 1 μm, or a thin film formed by chemical deposition or physical deposition of silica or magnesium fluoride. Resins other than the fluororesin are the same as used for constituting the antistatic layer.

More preferably, the lower-refractive index layer is formed of a silicone-containing vinylidene fluoride copolymer. Specifically, this silicone-containing vinylidene fluoride copolymer comprises a resin composition comprising 100 parts of a fluorocopolymer prepared by copolymerization using, as a starting material, a monomer composition containing 30 to 90% (all the percentages being by mass; the same shall apply hereinafter) of vinylidene fluoride and 5 to 50% of hexafluoropropylene, and having a fluorine content of 60 to 70% and 80 to 150 parts of an ethylenically unsaturated group-containing polymerizable compound. This resin composition is used to form a lower-refractive index layer having a refractive index of less than 1.60 (preferably not more than 1.46) which is a thin film having a thickness of not more than 200 nm and to which scratch resistance has been imparted.

For the silicone-containing vinylidene fluoride copolymer constituting the lower-refractive index layer, the content of individual components in the monomer composition is 30 to 90%, preferably 40 to 80%, particularly preferably 40 to 70%, for vinylidene fluoride, and 5 to 50%, preferably 10 to 50%, particularly preferably 15 to 45%, for hexafluoropropylene. This monomer composition may further comprise 0 to 40%, preferably 0 to 35%, particularly preferably 10 to 30%, of tetrafluoroethylene.

The above monomer composition may comprise other comonomer component in such an amount that is not detrimental to the purpose of use and effect of the silicone-containing vinylidene fluoride copolymer, for example, in an amount of not more than 20%, preferably not more than 10%. Specific examples of other comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The fluorocopolymer produced from this monomer composition should have a fluorine content of 60 to 70%, preferably 62 to 70%, particularly preferably 64 to 68%. When the fluorine content is in the above-defined specific range, the fluoropolymer has good solubility in solvents. The incorporation of the above fluoropolymer as a component can result in the formation of a thin film which has excellent adhesion to various base materials, has a high level of transparency and a low level of refractive index and, at the same time, has satisfactorily high mechanical strength. Therefore, the surface with the thin film formed thereon has a satisfactorily high level of mechanical properties such as scratch resistance which is very advantageous.

Preferably, the molecular weight of the fluorocopolymer is 5,000 to 200,000, particularly preferably 10,000 to 100,000, in terms of number average molecular weight as determined using polystyrene as a standard. When the fluorocopolymer having this molecular weight is used, the fluororesin composition has suitable viscosity and thus reliably has suitable coatability. The refractive index of the fluorocopolymer per se is preferably not more than 1.45, particularly preferably not more than 1.42, still more preferably not more than 1.40. When a fluorocopolymer having a refractive index exceeding 1.45 is used, in some cases, the thin film formed from the resultant fluorocoating composition has a low level of antireflection effect.

The lower-refractive index layer may also be formed of a thin film of $SiO_2$. This lower-refractive index layer may be formed, for example, by vapor deposition, sputtering, or plasma CVD, or by a method in which an $SiO_2$ gel film is formed from a sol liquid containing an $SiO_2$ sol. In addition to $SiO_2$, a thin film of $MgF_2$ or other material may constitute the lower-refractive index layer. However, the use of a thin film of $SiO_2$ is preferred from the viewpoint of high adhesion to the lower layer. Among the above methods, when plasma CVD is adopted, a method is preferably adopted in which an organosiloxane is used as a starting gas and the CVD is carried out in such a state that other inorganic vapor deposition sources are not present. Further, preferably, in the CVD, the substrate is kept at the lowest possible temperature.

In a preferred embodiment of the present invention, "void-containing fine particles" are utilized. The "void-containing fine particles" can lower the refractive index while maintaining the strength of the lower-refractive index layer. In the present invention, the expression "void-containing fine particles" refers to fine particles that have a structure containing gas filled into fine particles and/or a gas-containing porous structure and have a refractive index which is lowered inversely proportionally to the proportion of gas in the fine particles as compared with the refractive index of the fine particles per se. Further, in the present invention, the fine particles include those which can form a nanoporous structure in at least a part of the inside and/or surface of the fine particle depending upon the form, structure, aggregation state, and dispersion state of the fine particles within the coating film.

Specific examples of preferred void-containing inorganic fine particles include silica fine particles prepared by a technique disclosed in Japanese Patent Laid-Open No. 233611/2001. The void-containing silica fine particles can easily be produced, and the hardness of the void-containing silica fine particles per se is high. Therefore, when a lower-refractive index layer is formed of a mixture of the void-containing silica fine particles with a binder, the layer strength can be improved and the refractive index can be regulated to fall within a range of about 1.20 to 1.45. In particular, specific examples of preferred void-containing organic fine particles include empty polymer fine particles prepared by a technique disclosed in Japanese Patent Laid-Open No. 80503/2002.

Fine particles which can form a nanoporous structure in at least a part of the inside and/or surface of the coating film include, in addition to the above silica fine particles, sustained release materials which have been produced for increasing the specific surface area and adsorb various chemical substances in a packing column and a porous part provided on the surface thereof, porous fine particles for catalyst fixation purposes, or dispersions or aggregates of empty fine particles to be incorporated in insulating materials or low-permittivity materials. Specific examples thereof include those in a preferred particle diameter range of the present invention selected from commercially available products, for example, aggregates of porous silica fine particles selected from Nipsil or Nipgel (tradenames, manufactured by Nippon Silica Industrial Co., Ltd.), Colloidal silica (tradename) UP series, manufactured by Nissan Chemical Industries Ltd. having a structure in which silica fine particles are connected to one another in a chain form.

The average particle diameter of the "void-containing fine particles" is not less than 5 nm and not more than 300 nm. Preferably, the lower limit is 8 nm, and the upper limit is 100 nm. More preferably, the lower limit is 10 nm, and the upper limit is 80 nm. When the average particle diameter of the fine particles is in the above-defined range, excellent transparency can be imparted to the lower-refractive index layer.

Anti-Fouling Layer

In a preferred embodiment of the present invention, an anti-fouling layer may be provided for preventing fouling of the outermost surface of the lower-refractive index layer. Preferably, the anti-fouling layer is provided on the surface of the light transparent base material remote from the lower-refractive index layer. The anti-fouling layer can further improve anti-fouling properties and scratch resistance of the antireflective laminate.

Specific examples of agents for the anti-fouling layer include fluorocompounds and/or silicon compounds, which have low compatibility with an ionizing radiation curing resin composition having a fluorine atom in its molecule and cannot be incorporated into the lower-refractive index layer without difficulties, and fluorocompounds and/or silicon compounds which are compatible with an ionizing radiation curing resin composition having a fluorine atom in its molecule and fine particles.

2. Production Process of Optical Laminate

Preparation of Composition

Each composition for the hardcoat layer (if necessary, antistatic layer, anti-dazzling layer, and low-refractive index layer) may be prepared according to a conventional preparation method by mixing the above-described components together and subjecting the mixture to dispersion treatment. The mixing and dispersion can be properly carried out, for example, by a paint shaker or a beads mill.

Coating

Specific examples of methods for coating each composition onto a surface of the light transparent base material and a surface of the antistatic layer include various methods such as spin coating, dip coating, spraying, die coating, bar coating, roll coating, meniscus coating, flexographic printing, screen printing, and bead coating.

The curing-type resin composition may be cured by electron beam or ultraviolet light irradiation. In the case of electron beam curing, for example, electron beams having an energy of 100 KeV to 300 KeV. In the case of ultraviolet curing, for example, ultraviolet light emitted from ultrahigh pressure mercury lamps, high pressure mercury lamps, low pressure mercury lamps, carbon arcs, xenon arcs, metal halide lamps or the like may be used.

3. Use of Optical Laminate

The optical laminate according to the present invention as a hardcoat laminate is preferably utilized as antireflective laminates. The optical laminate according to the present invention is utilized in transmission display devices. In particular, the optical laminate according to the present invention is used for display in televisions, computers, word processors and the like, especially on display surfaces, for example, in CRTs or liquid crystal panels.

EXAMPLES

Preparation of Optical Laminate

Compositions for a hardcoat layer prepared according to the formations shown in Table 1 below were coated onto one side of a cellulose triacetate film (thickness 40 μm, 80 μm) at a coverage of 15 g/m$^2$ on a wet basis (6 g/m$^2$ on a dry basis). The coating was dried at 50° C. for 30 sec and was then exposed to ultraviolet light at 100 mJ/cm$^2$ to prepare optical laminates of Examples and Comparative Examples.

Evaluation Test

The optical laminates prepared in Examples and Comparative Examples are evaluated by the following tests. The results are shown in Table 1 below.

Evaluation 1: Interference Fringes

A black tape for the prevention of reflection of light from backside was applied to the surface of the optical laminate remote from the hardcoat layer, and the optical laminate was visually inspected from the surface of the hardcoat layer. The results were evaluated based on the following criteria.

Evaluation Criteria

◎: Interference fringes did not occur.

○: Interference fringes were slightly observed on such a level that was acceptable as a product.

x: Interference fringes occurred.

Evaluation 2: Scratch Resistance

The surface of the hardcoat layer in the optical laminate was rubbed with steel wool (#0000) by 10 reciprocations in such a state that a predetermined frictional load (varied in 200 g increments from 200 g until the load reaches 1500 g). Thereafter, the hardcoat layer was visually inspected for separation of the hardcoat layer. The results were evaluated according to the following criteria.

Evaluation Criteria

◎: The separation of the hardcoat layer did not occur under a load of 1500 g.

○: The separation of the hardcoat layer occurred under a load of 800 g.

Δ: The separation of the hardcoat layer occurred under a load of 400 g.

x: The separation of the hardcoat layer occurred under a load of 200 g.

Evaluation 3: Interface

The section of the optical laminate was observed in a transmission manner under a confocal laser microscope (Leica TCS-NT; magnification "500 to 1000", manufactured by Leica Microsystems) to determine whether or not an interface is present. The results were evaluated according to the following criteria. Specifically, in order to obtain halation-free sharp images, a wet-type objective lens was used in the confocal laser microscope, and about 2 ml of an oil having a refractive index of 1.518 was placed on the optical laminate for evaluation of the interface. The oil was used for allowing an air layer between the objective lens and the optical laminate to disappear.

Evaluation Criteria

◎: No interface was observed (note 1).

x: An interface was observed (note 2).

Notes 1 and 2

Note 1: In all the Examples of the present invention, as shown in FIG. 1, only the interface of oil surface (upper layer)/hardcoat layer (lower layer) was observed, and the interface between the hardcoat layer and the light transparent base material was not observed.

Figure 2:
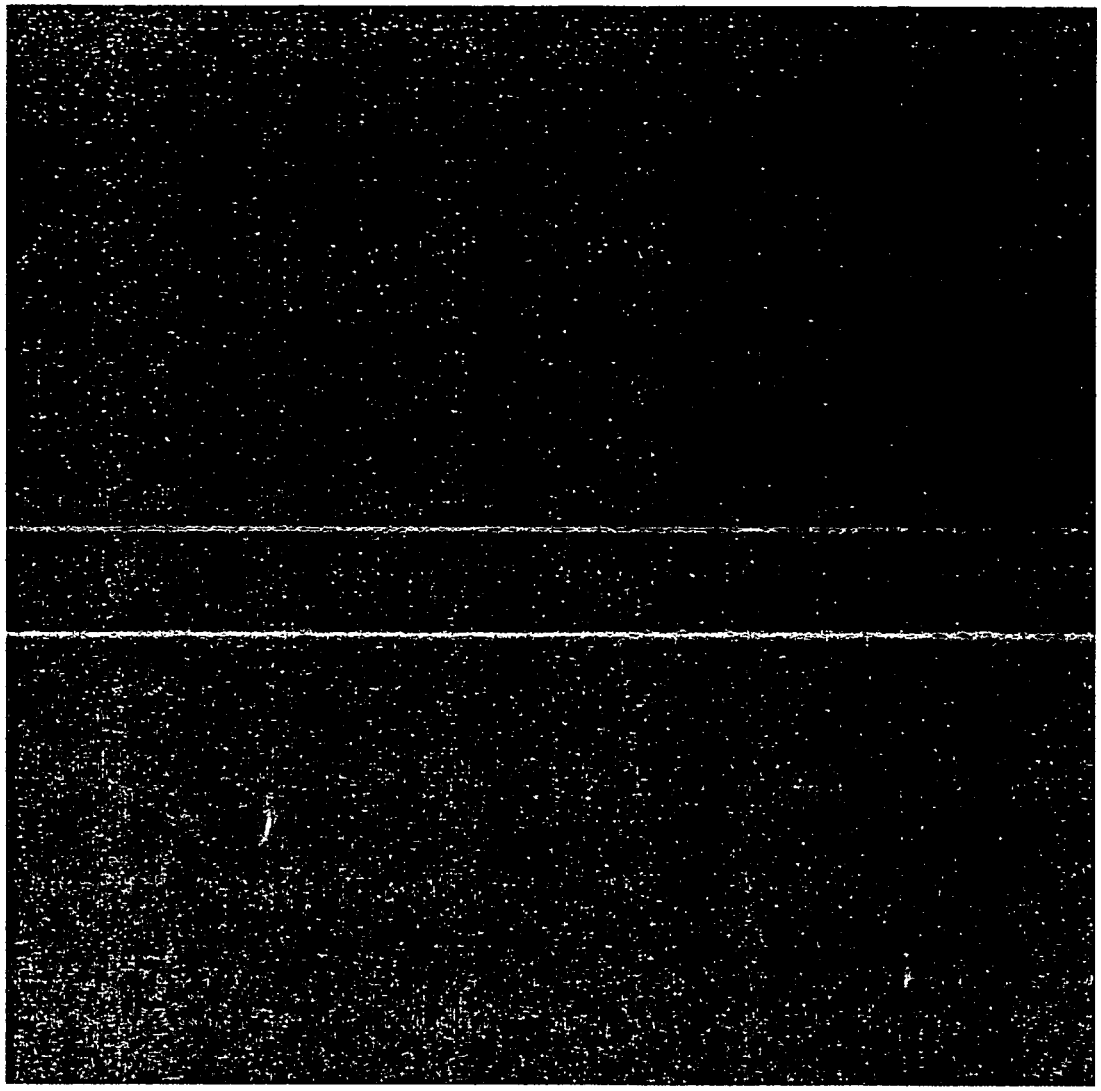
FIG. 2 is a laser microphotograph of the section of a comparative optical laminate.

Note 2: For all the Comparative Examples, as shown in FIG. 2, an interface was observed in mutual boundaries of oil surface (upper layer)/hardcoat layer (middle layer)/light transparent base material (lower layer).

Description in Table 1

M 305: pentaerythritol triacrylate
(trifunctional; molecular weight 298; manufactured by TOAGOSEI CO., LTD.)

M 215: isocyanuric acid EO-modified diacrylate
(bifunctional; molecular weight 333; manufactured by TOAGOSEI CO., LTD.)

UV 1700 B: urethane acrylate
(decafunctional; molecular weight 2000; manufactured by TOAGOSEI CO., LTD.)

DPHA 40H: urethane acrylate
(decafunctional; molecular weight 7000; manufactured by Nippon Kayaku Co., Ltd.)

M 240: polyethylene glycol diacrylate
(bifunctional; molecular weight 302; manufactured by TOAGOSEI CO., LTD.)

M 1310: urethane acrylate
(bifunctional; molecular weight 4500; manufactured by TOAGOSEI CO., LTD.)

BEAM SET 371: urethane acrylate
(polyfunctional; molecular weight 40000; manufactured by Arakawa Chemical Industries, Ltd.)

MEK: methyl ethyl ketone

Polymerization initiator: for each of the Examples and Comparative Examples, 0.4 part by weight of Irgacure 184 (manufactured by Ciba Specialty Chemicals K.K.)

In the table, "Amount": pts.wt.

Solvent: 15 parts by weight of each solvent was added.

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Resin (1) | Name | M 305 | M 305 | M 305 | M 305 | UV 1700 B | DPHA 40 H | M 305 | UV 1700 B |
|  | Molecular weight | 298 | 298 | 298 | 298 | 2000 | 7000 | 298 | 2000 |
|  | Functionality | 3 | 3 | 3 | 3 | 10 | 10 | 3 | 10 |
|  | Amount | 7 | 2 | 9 | 7 | 7 | 7 | 7 | 7 |
| Resin (2) | Name | M 215 | M 215 | M 215 | M 240 | M 240 | M 240 | M 215 | M 215 |
|  | Molecular weight | 333 | 333 | 333 | 302 | 302 | 302 | 333 | 333 |
|  | Functionality | 2 | 2 | 2 | 2 | 2 | 2 | 2 | 2 |
|  | Amount | 3 | 8 | 1 | 3 | 3 | 3 | 3 | 2 |
| Resin (3) | Name |  |  |  |  |  |  |  | 371 |
|  | Molecular weight |  |  |  |  |  |  |  | 40000 |
|  | Functionality |  |  |  |  |  |  |  | Polyfunctional |
|  | Amount |  |  |  |  |  |  |  | 1 |
| Polymerization initiator |  | 0.4 | 0.4 | 0.4 | 0.4 | 0.4 | 0.4 | 0.4 | 0.4 |
| Solvent |  | Methyl acetate | MEK | MEK | MEK | MEK | MEK | Methyl acetate | MEK |
| Evaluation 1 |  | ◎ | ◎ | ◎ | ◎ | ◎ | ◎ | ◎ | ◎ |
| Evaluation 2 |  | ◎ | ◎ | ◎ | ◎ | ◎ | ◎ | ◎ | ◎ |
| Evaluation 3 |  | ◎ | ◎ | ◎ | ◎ | ◎ | ◎ | ◎ | ◎ |

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Resin (1) | Name | M 305 | M 240 | M 305 | D 505 |  |  |
|  | Molecular weight | 298 | 302 | 298 | 20000 |  |  |
|  | Functionality | 3 | 2 | 3 | Polyfunctional |  |  |
|  | Amount | 7 | 7 | 7 | 7 |  |  |
| Resin (2) | Name | M 215 | M 215 | M 1310 | M 215 |  | M 215 |
|  | Molecular weight | 333 | 333 | 4500 | 333 |  | 333 |
|  | Functionality | 2 | 2 | 2 | 2 |  | 2 |
|  | Amount | 3 | 10 | 3 | 3 |  | 10 |
| Resin (3) | Name |  |  |  |  | 371 |  |
|  | Molecular weight |  |  |  |  | 40000 |  |
|  | Functionality |  |  |  |  | Polyfunctional |  |
|  | Amount |  |  |  |  | 10 |  |
| Polymerization initiator |  | 0.4 | 0.4 | 0.4 | 0.4 | 0.4 | 0.4 |
| Solvent |  | Toluene | MEK | MEK | MEK | MEK | MEK |
| Evaluation 1 |  | x | ○ | x | x | x | ○ |
| Evaluation 2 |  | ○ | Δ | Δ | ○ | ○ | x |
| Evaluation 3 |  | x | ○ | x | x | x | ○ |

The invention claimed is:

1. An optical laminate comprising:
   a light transparent base material; and
   a hardcoat layer provided on said light transparent base material;
   wherein said hardcoat layer comprises a composition comprising
      a first resin having a weight average molecular weight of not less than 200 and not more than 10000 and containing more than 2 functional groups,
      a second resin having a weight average molecular weight of not less than 200 and not more than 1000 and containing two or less functional groups, and
      a penetrative solvent;
   wherein a mixing ratio between said first resin and said second resin is more than 9.5:0.5 and not more than 2:8.

2. The optical laminate according to claim 1, which said composition further comprises a third resin having a weight average molecular weight of not less than 10000 and containing more than 2 functional groups.

3. The optical laminate according to claim 2, wherein a mixing ratio between said first resin and said second resin, and said third resin is not less than 5:95 and not more than 95:5.

4. The optical laminate according to claim 1, wherein said first resin, said second resin, and said third resin are each one resin or a mixture of at least two resins selected from the group consisting of acrylic resins, polyester resins, polyolefin resins, polycarbonate resins, poly amide resins, polyether resins, epoxy resins, urethane resins, alkyd resins, spiroacetal resins, polybutadiene resins, polythiol polyether resins, polyhydric alcohols, and (meth)acrylate resins.

5. The optical laminate according to claim 1, wherein said functional group is a functional group selected from the group consisting of (meth)acrylate functional groups, a hydroxyl group, a carboxyl group, an epoxy group, an amino group, a vinyl group, and alkoxyl groups.

6. The optical laminate according to claim 1, wherein said hardcoat layer comprises an antistatic agent and/or an anti-dazzling agent.

7. The optical laminate according to claim 1, wherein an antistatic layer, an anti-dazzling layer, a lower-refractive index layer, an anti-fouling layer, or two or more of these layers are provided between the light transparent base material and the hardcoat layer or on the hardcoat layer.

8. The optical laminate according to claim 1, which is used as an anti-reflection laminate.

* * * * *